(12) United States Patent
Hokari et al.

(10) Patent No.: US 10,747,037 B2
(45) Date of Patent: Aug. 18, 2020

(54) DISPLAY DEVICE

(71) Applicant: AGC Inc., Chiyoda-ku (JP)

(72) Inventors: Ryou Hokari, Tokyo (JP); Atsushi Inoue, Tokyo (JP); Yasuhiro Inoue, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/534,002

(22) Filed: Aug. 7, 2019

(65) Prior Publication Data
US 2020/0050049 A1   Feb. 13, 2020

(30) Foreign Application Priority Data

Aug. 10, 2018 (JP) .................. 2018-151626

(51) Int. Cl.
*G02F 1/1333* (2006.01)
*B32B 17/10* (2006.01)

(52) U.S. Cl.
CPC .. *G02F 1/133308* (2013.01); *B32B 17/10706* (2013.01); *G02F 2001/133317* (2013.01);
(Continued)

(58) Field of Classification Search
CPC .... G02F 1/13; G02F 1/1333; G02F 1/133308; G02F 1/133362; G02F 1/1335; G02F 1/1336; G02F 1/133608; G02F 1/133615; G02F 1/13338; G02F 2001/133331; G02F 2001/133317; G02F 2001/13332; G02F 2001/133311; G02F 2001/133314; G02F 2202/28; G02F 2201/50; G02F 2201/503; B32B 7/12; B32B 7/1284; B32B 17/06; B32B 17/064; B32B 17/00; B32B 17/1055; B32B 17/10706; B32B 2255/26; B32B 2315/08; B32B 2457/202; B32B 2457/208; B32B 2605/00
See application file for complete search history.

(56) References Cited

U.S. PATENT DOCUMENTS

2014/0232969 A1   8/2014  Tsubaki et al.
2015/0168767 A1*  6/2015  Yonemura ......... G02F 1/133308
                                              349/58

FOREIGN PATENT DOCUMENTS

DE  11 2016 002 507 T5   3/2018
DE  11 2018 002 116 T5   1/2020
(Continued)

*Primary Examiner* — Thoi V Duong
(74) *Attorney, Agent, or Firm* — Oblon, McClelland, Maier & Neustadt, L.L.P.

(57) ABSTRACT

A display device includes a display panel, and a cover member with which the display panel is covered. The cover member includes a second main surface facing the display panel, a first main surface opposite to the second main surface, and an end surface connecting the first main surface to the second main surface. A line D is defined as an imaginary line that passes through an edge E formed by the first main surface and the end surface, and members of a first layer to a $n^{th}$ layer (n: an inter of 2 or more) are arranged on the line D, the cover member being the first layer. A gap exists in a part between the cover member and the member of the $n^{th}$ layer. The display device satisfies the specific relations (1) to (3).

16 Claims, 3 Drawing Sheets

(52) U.S. Cl.
CPC ............ *G02F 2001/133331* (2013.01); *G02F 2201/503* (2013.01)

(56) References Cited

FOREIGN PATENT DOCUMENTS

JP          2014-160218 A     9/2014
JP          A-2018-197176     12/2018

* cited by examiner

DISPLAY DEVICE

CROSS-REFERENCE TO RELATED APPLICATIONS

This application claims priority from Japanese Patent Application No. 2018-151626 filed on Aug. 10, 2018, the entire subject matter of which is incorporated herein by reference.

BACKGROUND OF INVENTION

Technical Field

The present invention relates to a display device.

Background Art

In the related art, a cover member for protecting a display panel such as a liquid crystal panel is used in display devices such as in-vehicle display devices (see Patent Literature 1).

In the display device disclosed in Patent Literature 1, a cover member (display cover) and a housing (display cover support case) are bonded to each other with adhesive members. Thus, on the back surface side of an end portion of the cover member, a gap having a thickness corresponding to the thickness of the adhesive members in the thickness direction of the cover member exists between the cover member and the housing.

Patent Literature 1: JP 2014-160218 A

SUMMARY OF INVENTION

From the viewpoint of safety, the cover member of an in-vehicle display device is required to have high impact resistance such that the cover member is not broken even if head of the like of a driver hits it when the vehicle encounters a collision accident.

In recent years, in particular, an end portion of a cover member is required to be high in impact resistance (hereinafter referred to as "end portion impact resistance"). This is because the head of the driver may hit the end portion of the cover member from an oblique direction at the time of a collision accident, depending on an installation position of the in-vehicle display device. Where the cover member is a glass, the end portion of the cover member is formed with processing flaws and hence are particularly prone to be broken.

The present inventors studied the display device disclosed in Patent Literature 1 and found that there are cases that the cover member is insufficient in end portion impact resistance.

The present invention has been made in view of the above points and an object of the present invention is therefore to provide a display device that is superior in the end portion impact resistance of a cover member.

After studying diligently, the present inventors have found that the above object could be attained by employing the following configurations.

That is, the present invention provides the following <1> to <16>.

<1> A display device, comprising:
a display panel; and
a cover member with which the display panel is covered, wherein:
the cover member includes a second main surface which faces the display panel, a first main surface which is opposite to the second main surface, and an end surface which connects the first main surface to the second main surface;
a line D is defined as an imaginary line that passes through an edge E formed by the first main surface of the cover member and the end surface of the cover member, and members of a first layer to a $n^{th}$ layer are arranged on the line D, the cover member being the first layer and n being an integer of 2 or more;
a gap exists in a part between the cover member and the member of the $n^{th}$ layer; and
the following relations (1) to (3) are satisfied:

$$B_1 = b_1 + b_2 < 1.33 \tag{1}$$

$$b_1 = (0.0982G + 3.3083)K + 0.1427G + 0.3651 \tag{2}$$

$$b_2 = 0.1401G + 0.5424 \tag{3}$$

where G is a gap length of the gap, in mm, in a thickness direction of the cover member in a region through which the line D passes, and K in the relation (2) is defined as follows:

$$K = E_1 t_1^2 / (E_1 t_1^2 + \ldots + E_n t_n^2)$$

where $E_1$ is Young's modulus, in GPa, of the cover member, $t_1$ is a thickness, in mm, of the cover member, $E_n$ is Young's modulus, in GPa, of the member of the $n^{th}$ layer, and $t_n$ is a length of the member of the $n^{th}$ layer, in mm, in the thickness direction of the cover member in the region through which the line D passes.

<2> The display device according to the above <1>, wherein an angle formed by the line D and an imaginary line F being an imaginary line that is along the first main surface and extends to the side of the end surface is 30° to 90°.

<3> The display device according to the above <2>, wherein the angle formed by the line D and the imaginary line F is 45° or 60°.

<4> The display device according to any one of the above <1> to <3>, wherein the $B_1$ satisfies the following relation (4):

$$B_1 = b_1 + b_2 < 1.21. \tag{4}$$

<5> The display device according to any one of the above <1> to <4>, wherein the cover member is a glass.

<6> The display device according to the above <5>, wherein the glass is a chemically strengthened glass.

<7> The display device according to the above <6>, wherein the chemically strengthened glass includes a compressive stress layer having a thickness of 10 μm or more, and the compressive stress layer has a surface compressive stress of 500 MPa or more.

<8> The display device according to any one of the above <1> to <7>, wherein the thickness $t_1$ of the cover member is 0.5 to 3.0 mm.

<9> The display device according to any one of the above <1> to <8>, wherein the gap exists between the cover member and the member of a second layer.

<10> The display device according to any one of the above <1> to <9>, wherein the member of a second layer is made of an ABS resin or a PC resin.

<11> The display device according to any one of the above <1> to <10>, wherein the member of a third layer is made of a stainless steel, an aluminum, or a magnesium alloy.

<12> The display device according to any one of the above <1> to <11>, wherein the member of a fourth layer is made of a magnesium alloy, a stainless steel, or an aluminum.

<13> The display device according to any one of the above <1> to <12>, wherein the member of a fifth layer is made of an ABS resin or a PC resin.

<14> The display device according to any one of the above <1> to <13>, further comprising a function layer in/on a surface of the cover member.

<15> The display device according to the above <14>, wherein the function layer includes at least one layer selected from the group consisting of an antireflection layer, an antiglare layer, and an antifouling layer.

<16> The display device according to any one of the above <1> to <15>, wherein the display device is an in-vehicle display device.

The present invention can provide a display device that is superior in the end portion impact resistance of a cover member.

DETAILED DESCRIPTION OF THE INVENTION

In this specification, a numerical range using the word "to" means a range that includes numerical values written before and after "to" as a lower limit and an upper limit, respectively.

Although embodiments of the present invention are hereinafter described, the present invention is not limited to the embodiments. Various modifications and replacements can be made in the following embodiments without departing from the scope of the present invention.

In the following description, for the sake of convenience, a display device according to one embodiment of the present invention may be referred to as a "display device according to the present invention."

Figure 1:
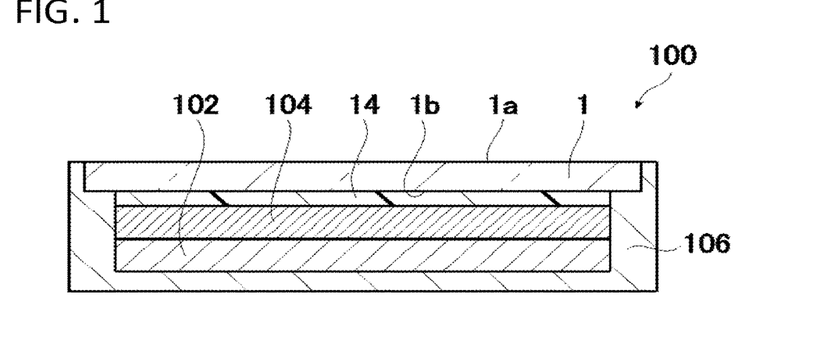
FIG. 1 is a sectional view of a display device according to one embodiment of the present invention.

FIG. 1 is a sectional view of a display device 100 according to the one embodiment of the present invention. For example, the display device 100 is an in-vehicle display device that is installed in a vehicle such as an automobile. Examples of the in-vehicle display device include a car navigation device and a rear seat entertainment (RSE) device which allows passengers in the rear seat to watch videos etc.

As shown in FIG. 1, the display device 100 includes a housing 106 which houses individual units. A backlight unit 102 is disposed inside the housing 106 and a display panel 104 which is a liquid crystal panel is disposed on the backlight unit 102.

There are no particular limitations on the configurations of the display panel 104 and the backlight unit 102, and commonly used configurations can be used. For example, the display device 100 may be a display device having an organic EL (Electro Luminescence) panel with no backlight unit, an electronic ink panel, or the like and may have a touch panel or the like.

As shown in FIG. 1, a cover member 1 is bonded to the display panel 104 with an adhesive layer 14. The display panel 104 is covered with the cover member 1. As described later, the cover member 1 is, for example, a glass.

The cover member 1 includes a first main surface 1a which is one main surface, a second main surface 1b which is the other main surface, and end surfaces 1d which connect the first main surface 1a to the second main surface 1b. The second main surface 1b of the cover member 1 is bonded to the display panel 104 via the adhesive layer 14. That is, the second main surface 1b faces the display panel 104. On the other hand, the first main surface 1a faces a so-called viewing side.

Examples of the adhesive layer 14 include a layer made of a transparent resin obtained by curing a liquid curable resin composition. Alternatively, the adhesive layer 14 may be an OCA (optical clear adhesive) film or an OCA tape. The thickness of the adhesive layer 14 should be 5 μm to 400 μm, for example, and is preferably 50 μm to 200 μm.

Figure 2:
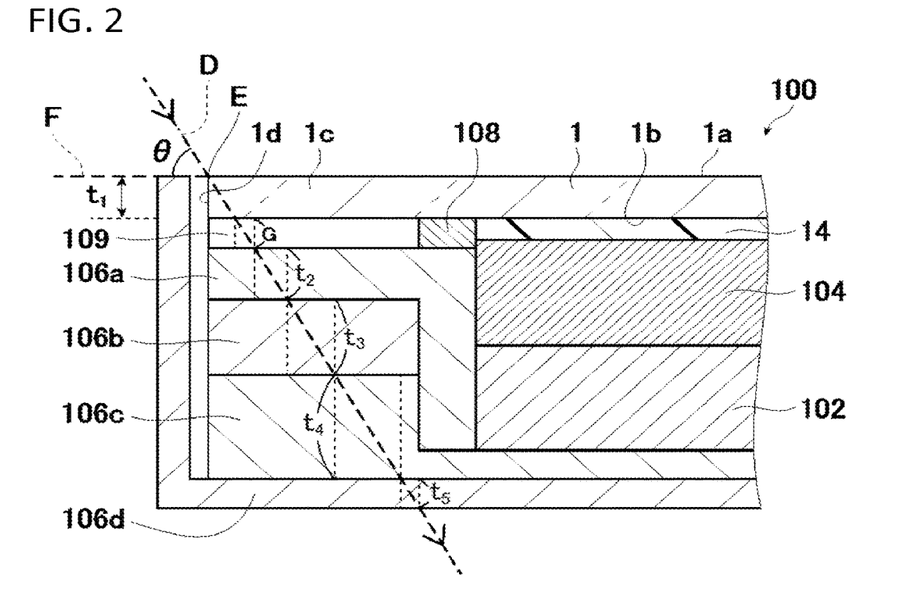
FIG. 2 is an enlarged sectional view of part of the display device according to the one embodiment of the present invention.

FIG. 2 is an enlarged sectional view of a part (i.e., an end portion 1c of the cover member 1 and its vicinity) of the display device 100 according to the one embodiment of the present invention. The configuration of the display device 100 is not limited to this configuration.

The housing 106 of the display device 100 includes plural members. More specifically, on the back surface (second main surface 1b) side of the end portion 1c of the cover member 1, plural members are stacked one another in the thickness direction of the cover member 1 (top-bottom direction in FIG. 2). More specifically, as shown in FIG. 2, a member 106c is disposed inside and on the top surface side of a member 106d which is L-shaped in cross section, a member 106b is disposed on the member 106c, and the member 106b is covered with a member 106a which is L-shaped in cross section.

As shown in FIG. 2, an imaginary line which passes through an edge E formed by the first main surface 1a and an end surface 1d of the cover member 1 is defined as line D (represented by symbol D in FIG. 2). It is preferable that the angle θ that is formed by the imaginary line D and an imaginary line F which is along the first main surface 1a and extends to the end surface 1d side can be selected from 30° to 90°, and it is preferable that the angle θ be 45° or 60°, and the angle θ being 60° is more preferable.

In the display device 100 shown in FIG. 2, members from the first layer to the fifth layer are arranged on the line D, and the first layer is the cover member 1. That is, as shown in FIG. 2, the line D passes through the cover member 1 (first layer), the member 106a (second layer), the member 106b (third layer), the member 106c (fourth layer), and the member 106d (fifth layer).

Examples of the material of the cover member 1 include a transparent resin, a glass and the like, and the use of glass is preferable.

In the case where the cover member 1 is a glass, use of a chemically strengthened glass is more preferable.

In the surface of the chemically strengthened glass, a compressive stress layer is formed. For example, the thickness (DOL) of the compressive stress layer should be 10 μm or more, and preferably 15 μm or more, more preferably 25 μm or more, and further preferably 30 μm or more.

For example, the surface compressive stress (CS) of the compressive stress layer in the chemically strengthened glass is preferably 500 MPa or more, more preferably 650

MPa or more, and further preferably 750 MPa or more. There are no particular limitations on the upper limit of the surface compressive stress, and for example, it is preferable that the surface compressive stress be 1,200 MPa or less.

As typical method for producing a chemically strengthened glass by subjecting a glass to chemically strengthening treatment, examples thereof include the following method: a glass is immersed in a $KNO_3$ molten salt to subject it to ion exchange treatment and then the temperature is lowered to room temperature. It is appropriate to set processing conditions such as the temperature of the $KNO_3$ molten salt and the immersion time so that the surface compressive stress and the thickness of the compressive stress layer become desired values.

Example of the kind of glass include soda-lime glass and aluminosilicate glass ($SiO_2$—$Al_2O_3$—$Na_2O$ glass). From the viewpoint of strength, use of aluminosilicate glass is preferable.

Example of glass materials include a glass material including, in mol %, 50% to 80% of $SiO_2$, 1% to 20% of $Al_2O_3$, 6% to 20% of $Na_2O$, 0% to 11% of $K_2O$, 0% to 15% of MgO, 0% to 6% of CaO, and 0% to 5% of $ZrO_2$.

Aluminosilicate glass-based chemically strengthened glass (e.g., Dragon Trail (registered trademark) manufactured by AGC Inc.) can also be used preferably.

The thickness $t_1$ of the cover member 1 is preferably 0.5 mm to 3.0 mm, more preferably 0.7 mm to 2.0 mm, further preferably 1.1 mm to 2.0 mm, and particularly preferably 1.1 mm to 1.3 mm.

The cover member 1 may be a cover member whose surface (in particular, first main surface 1a) has a function layer. Since the thickness of the function layer is very small, the thickness of the cover member having the function layer may be regarded as the thickness $t_1$ of the cover member.

The function layer may be formed by either processing the surface layer of a cover member or stacking another layer on the surface of a cover member.

Examples of the function layer include an antireflection layer, an antiglare layer, an antifouling layer, and a light shielding layer, and it is preferable that the function layer include at least one layer selected from the group consisting of an antireflection layer, an antiglare layer, and an antifouling layer.

The antireflection layer is a layer capable of reducing the degree of glare due to reflection of external light by lowering the reflectance. In the case where a cover member having an antireflection layer is used, the transmittance of light coming from the display panel is increased, whereby a display image can be made clear.

There are no particular limitations on the material of the antireflection layer; any of various materials can be used as long as it can prevent reflection of light. For example, the antireflection layer may have a structure that a high refractive index layer and low refractive index layer are stacked on each other. The term "high refractive index layer" as used herein means a layer whose refractive index at a wavelength of 550 nm is 1.9 or more, and the term "low refractive index layer" as used herein means a layer whose refractive index at a wavelength of 550 nm is 1.6 or less.

The antireflection layer may have either a structure including one high refractive index layer and one low refractive index layer or a structure including two or more high refractive index layers and two or more low refractive index layers. In the case where the antireflection layer includes two or more high refractive index layers and two or more low refractive index layers, it is preferable that each of the high refractive index layers and each of the low refractive index layers be stacked alternately.

There are no particular limitations on the materials of the high refractive index layer(s) and the low refractive index layer(s), and the materials can be selected taking into consideration the reduced degree of antiglare required, productivity required, and other factors.

Preferable examples of the material of the high refractive index layer(s) include a material containing at least one element selected from the group consisting of niobium, titanium, zirconium, tantalum, and silicon. More specifically, examples of the materials of the high refractive index layer(s) include niobium oxide ($Nb_2O_5$), titanium oxide ($TiO_2$), zirconium oxide ($ZrO_2$), tantalum oxide ($Ta_2O_5$), and silicon nitride.

Preferable examples of the material of the low refractive index layer(s) include a material containing silicon. More specifically, examples of the materials of the low refractive index layer(s) include silicon oxide ($SiO_2$), a material containing a mixture of oxides of Si and Sn, a material containing a mixture of oxides of Si and Zr, and a material containing a mixture of oxides of Si and Al.

There are no particular limitations on the method for forming the antireflection layer and any of various kinds of methods can be used. In particular, it is preferable that the antireflection layer be formed by pulse sputtering, AC sputtering, digital sputtering, or the like.

For example, the thickness of the antireflection layer is about 100 nm to 300 nm.

The antiglare layer is a layer capable of reducing the degree of glare due to reflection of light coming from a light source by scattering external light. In the case where the display panel is provided with a cover member having an antiglare layer, the degree of reflection of external light can be lowered when an image displayed on the display panel is viewed, whereby the display image looks clear.

There are no particular limitations on the method for forming the antiglare layer, and examples thereof include a method of etching a glass surface layer, a method of applying coating liquid containing fine particles and a matrix on the surface of glass and curing the matrix, and the like.

The antifouling layer is a layer capable of preventing sticking of an organic substance or an inorganic substance. Alternatively, the antifouling layer is a layer capable of easily removing an organic substance or an inorganic substance, if any, stuck to it by cleaning through wiping or the like. In the case where the antifouling layer is formed, no fingerprint remains even if the surface (first main surface) of the cover member is touched and hence the surface of the cover member can be kept clean. Thus, an image displayed on the display panel can be seen as a clear image.

It is common that the display device has a shape of a quadrilateral such as a rectangle, and in such a case, the cover member 1 also has a shape of a quadrilateral (rectangle). In the case where the cover member 1 has a shape of a quadrilateral (rectangle), for example, its lengths are 180 mm to 850 mm in a longer side direction and 85 mm to 180 mm in a shorter side direction, respectively.

Figure 3:
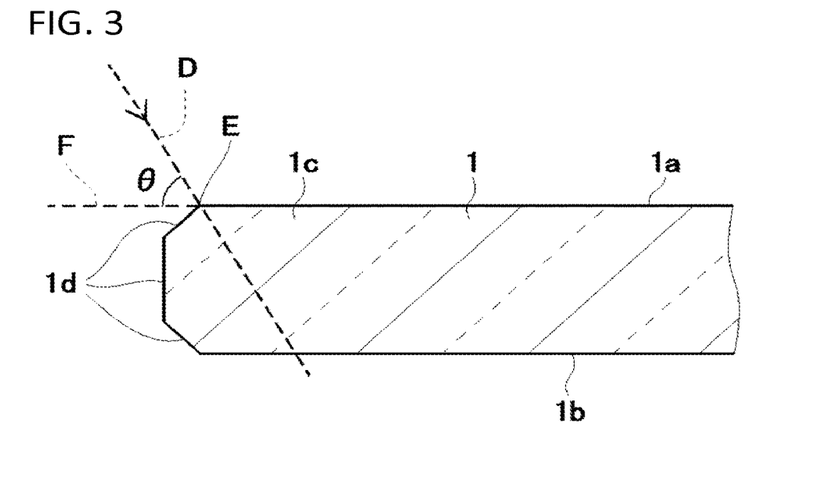
FIG. 3 is a sectional view of a cover member that has been chamfered.

FIG. 3 is a sectional view of a cover member 1 that has been chamfered. In the case where the cover member 1 is a glass, it may be chamfered. As shown in FIG. 3, for example, each of the end surfaces 1d of the chamfered cover member 1 is bent stepwise in a sectional view.

Also in the chamfered cover member 1, an imaginary line which passes through an edge E that is formed by the first main surface 1a and the end surface 1d is defined as line D. The angle θ that is formed by the line D and an imaginary line F which is along the first main surface 1a and extends to the end surface 1d side is as described above.

Returning to FIG. 2, the member 106a (second layer) should be a resin member, and it is preferable that the member 106a be made of, for example, an ABS resin (acrylonitrile-butadiene-styrene copolymer resin) or a PC resin (polycarbonate resin), and the ABS resin is more preferable.

Young's modulus of the member 106a is preferably 1 GPa to 5 GPa, and more preferably 2 GPa to 5 GPa.

The thickness of the member 106a is preferably 1 mm to 10 mm, more preferably 1 mm to 5 mm, and further preferably 2.0 mm to 2.7 mm.

Referring to FIG. 2, the member 106b (third layer) should be a metal member. For example, it is preferable that the member 106b be made of a stainless steel, an aluminum, or a magnesium alloy, and the stainless steel is more preferable.

Young's modulus of the member 106b is preferably 40 GPa to 220 GPa, and more preferably 70 GPa to 220 GPa.

The thickness of the member 106b is preferably 1 mm to 10 mm, more preferably 1 mm to 5 mm, and further preferably 2.5 mm to 5 mm.

Referring to FIG. 2, the member 106c (fourth layer) should be a metal member, and it is preferable that the member 106c be made of, for example, a magnesium alloy, a stainless steel, or an aluminum, and the magnesium alloy or stainless steel is more preferable, and the stainless steel is further more preferable. There are no particular limitations on the kind of magnesium alloy, and for example, Az31 (Al: 3% and Zn: 1%) or Az91 (Al: 9% and Zn: 1%) may be used as appropriate.

Young's modulus of the member 106c is preferably 40 GPa to 220 GPa, and more preferably 70 GPa to 220 GPa.

In particular, in the case where the member 106c is made of a magnesium alloy, the Young's modulus is preferably 40 GPa to 220 GPa, more preferably 40 GPa to 80 GPa, and further preferably 40 GPa to 50 GPa.

The thickness of the member 106c is preferably 1 mm to 10 mm, more preferably 2.5 mm to 10 mm and further preferably 2.5 mm to 4.5 mm.

Referring to FIG. 2, the member 106d (fifth layer) should be a resin member. For example, it is preferable that the member 106d be made of an ABS resin or a PC resin, and the ABS resin is more preferable.

Young's modulus of the member 106d is preferably 1 GPa to 5 GPa, and more preferably 2 GPa to 5 GPa.

The thickness of the member 106d is preferably 1 mm to 10 mm, more preferably 1 mm to 5 mm, and further preferably 1 mm to 2 mm.

As described above, in the display device according to the present invention, the members of the first to $n^{th}$ layers (n is an integer of 2 or more; and n is 5 in FIG. 5) are arranged on the line D with the cover member being as the first layer, that is, the line D passes through the members of the first to $n^{th}$ layers with the cover member as the first layer.

Young's modulus and the thickness of each of the members of the first to $n^{th}$ layers should be in the above-mentioned ranges, for example, and can be selected as appropriate so as to satisfy the relations described later, because a display device that is superior in the end portion impact resistance of the cover member can be provided by having these relations satisfied.

Here, n should be 2 or more, and n is preferably 3 or more. In addition, n is preferably 10 or less, and more preferably 6 or less.

As shown in FIG. 2, an adhesive member 108 such as a double-sided adhesive tape is disposed between the cover member 1 and the member 106a, and the adhesive member 108 is adjacent to the adhesive layer 14 or the display panel 104. Portions of the cover member 1 and the member 106a are bonded to each other with the adhesive member 108.

A gap 109 having a thickness corresponding to the thickness of the adhesive member 108 exists in the thickness direction of the cover member between the cover member 1 and the member 106a (second layer).

In this manner, a gap exists in a part between the cover member and the member of the $n^{th}$ layer. It is preferable that the gap exists between the cover member and the member of the second layer.

A gap length that is a length of the gap, in mm, in the thickness direction of the cover member in the region through which the line D passes is represented by symbol G. In the case of FIG. 2, the gap length G is the length of the gap 109 in the thickness direction of the cover member 1 in the region through which the line D passes.

The gap length G is preferably 0.1 mm to 0.8 mm, more preferably 0.1 mm to 0.6 mm, and further preferably 0.1 mm to 0.4 mm.

The end portion 1c of the cover member 1 may be construed either as a "portion of the cover member where the gap 109 exists on the side of the back surface (second main surface 1b) of the cover member 1" or a "portion that includes the edge E of the cover member 1."

Figure 4:
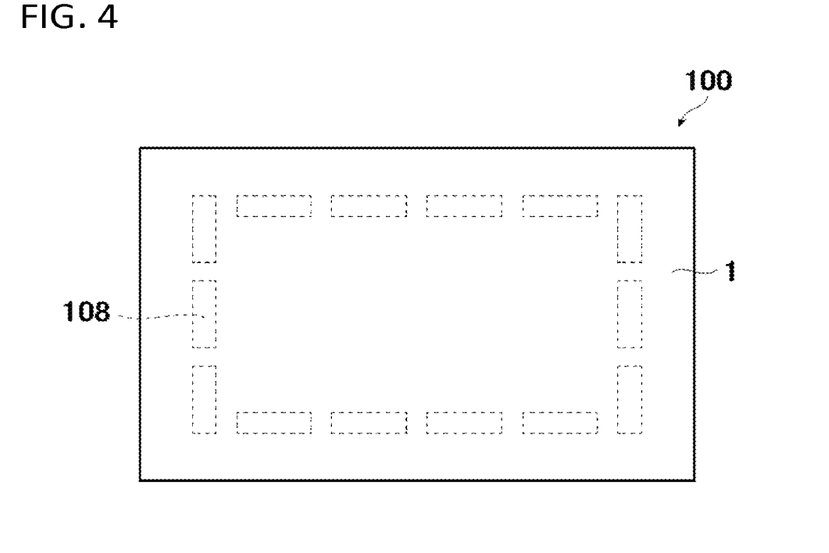
FIG. 4 is a plan view of the display device according to the one embodiment of the present invention.

FIG. 4 is a plan view of the display device 100 according to the one embodiment of the present invention. In FIG. 4, the adhesive members 108 are drawn by broken lines.

For example, the adhesive members 108 are disposed alongside the entire circumference of the cover member 1. It is preferable that, as shown in FIG. 4 the adhesive members 108 be disposed so as to be partially separated from each other to provide a space therebetween. With this structure, even when the housing 106 of the display device 100 is, for example, deformed, the cover member 1 is less prone to be twisted. This provides an advantage that occurrence of display unevenness in the display surface (display image) of the display panel 104 is prevented.

In contrast, there is a case that the adhesive member 108 is deformed continuously alongside the entire circumference of the cover member 1 to fix the cover member 1 to the housing 106. In this case, when the housing 106 is, for example, deformed, the cover member 1 is prone to be twisted. As a result, display unevenness may occur in the display surface (display image) of the display panel 104.

Figure 5:
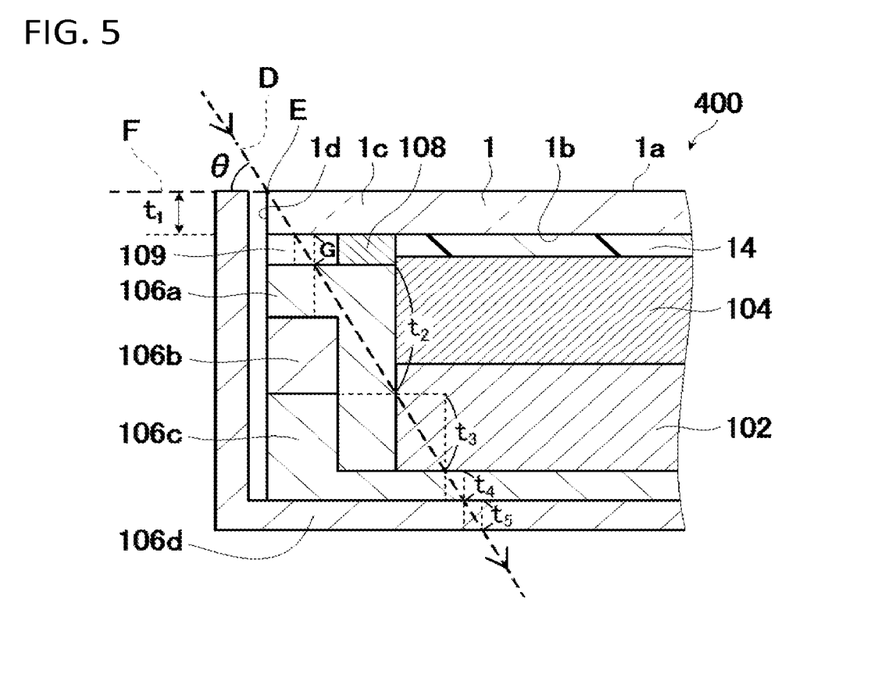
FIG. 5 is a sectional view of a display device according to another embodiment of the present invention.

FIG. 5 is a sectional view of a display device 400 according to another embodiment of the present invention. Members in FIG. 5 having the same (or corresponding) members in FIG. 1 to FIG. 4 are given the same reference symbols, and descriptions thereof may be omitted.

In the display device 400 shown in FIG. 5, as in the display device 100 described above with reference to FIG. 1 to FIG. 4, the members of the first to fifth layers are arranged on the line D as with a cover member 1 being as the first layer, that is, the line D passes through the members of the first to fifth layers with a cover member 1 being as the first layer. However, these members are arranged in a manner different from the case of the display device 100.

More specifically, in the display device 400 shown in FIG. 5, the cover member 1 (first layer), a member 106a (second layer), a backlight unit 102 (third layer), a member 106c (fourth layer), and a member 106d (fifth layer) are arranged on the line D, that is, the line D passes through the cover member 1 (first layer), a member 106a (second layer), a backlight unit 102 (third layer), a member 106c (fourth layer), and a member 106d (fifth layer).

Symbol $t_n$ represents the length (unit: mm) of the member of the $n^{th}$ layer in the thickness direction of the cover member 1 in the region through which the line D passes.

In the display device 100 described above with reference to FIG. 1 to FIG. 4, basically, $t_n$ represents the thickness of the member of the $n^{th}$ layer. On the other hand, in the display device 400 shown in FIG. 5, $t_n$ does not necessarily represent the thickness of the member of the $n^{th}$ layer.

For example, in the display device 400 shown in FIG. 5, $t_2$ represents the length of the L-shaped member 106a as the second layer and $t_3$ represents the thickness of a part of the backlight unit 102 as the third layer.

In the case where the display device according to the present invention is an in-vehicle display device, when the vehicle encounters a collision accident, the head of a driver may hit the edge E of the cover member obliquely along the line D depending on the installation position of the in-vehicle display device.

Thus, the end portion 1c of the cover member 1 is required to have so superior impact resistance (end portion impact resistance) as not to be broken even when it is hit by the head, for example, of a driver when the vehicle encounters a collision accident.

In the display device according to the present invention, as described above, the members of the first to $n^{th}$ layers (n: integer of 2 or more) are arranged on the line D with the cover member being as the first layer, that is, the line D passes through the members of the first to $n^{th}$ layers (n: integer of 2 or more) with the cover member being as the first layer.

Furthermore, in the display device according to the present invention, a gap exists between the cover member and the member of the $n^{th}$ layer.

The present inventors have found that the cover member of such a display device has superior end portion impact resistance in the case where the following relations (1) to (3) are satisfied.

$$B_1 = b_1 + b_2 < 1.33 \quad (1)$$

$$b_1 = (0.0982G + 3.3083)K + 0.1427G + 0.3651 \quad (2)$$

$$b_2 = 0.1401G + 0.5424. \quad (3)$$

Parameter K (hereinafter may be referred to as a "K value") in the relation (2) is defined as follows:

$$K = E_1 t_1^2 / (E_1 t_1^2 + \ldots + E_n t_n^2)$$

where $E_1$ is Young's modulus, in GPa, of the cover member, $t_1$ is a thickness, in mm, of the cover member, $E_n$ is Young's modulus, in GPa, of the member of the $n^{th}$ layer, and $t_n$ is a length of the member of the $n^{th}$ layer, in mm, in the thickness direction of the cover member in the region through which the line D passes.

Parameter $t_n$ may or may not represent the thickness of the member of the $n^{th}$ layer.

It can be said that the K value is an index of representing the rigidity of that member of the display device which is disposed at a position to be hit by a head, for example.

For example, in the case where members are arranged as first to fifth layers (i.e., n=5) with the cover member 1 as the first layer, the K value is given as follows:

$$K = E_1 t_1^2 / (E_1 t_1^2 + E_2 t_2^2 + E_3 t_3^2 + E_4 t_4^2 + E_5 t_5^2).$$

Young's modulus of each member is measured by a tensile test that is prescribed in JIS K 7161: 2014 and/or JIS Z 2241: 2011.

Technical meanings of the relations (1) to (3) are described below.

First, in order to avoid breaking the cover member, it is necessary that stress occurring in the back surface of the end portion of the cover member (also referred to as an "end portion back surface stress") be small when impact is received.

The present inventors simulated head impact tests (HITs) in which a spherical rigid model was caused to hit the edge E of the cover member along the line D for the cases where the K value was 0.053, 0.073, and 0.157 by setting the thickness $t_1$ of the cover member at 1.1 mm, 1.3 mm, and 2.0 mm, respectively, and the gap length G was varied in a range of 0.1 mm to 0.8 mm. In the simulations, the other conditions were fixed unless otherwise specified (this also applies to the following description).

HITs were simulated using PAM-CRASH (produced by ESI Japan, Ltd.) which is an analysis program on the market under the same conditions as employed in the following ⟨Evaluation of end portion impact resistance by head impact test⟩ of [Examples] (this also applies to the following description).

As a result, it was found that, for each K value, the end portion back surface stress occurring in the cover member at the time of impact decreases linearly as the gap length G becomes smaller.

Then, the present inventors simulated HITs for the cases where the gap length G was set at 0.1 mm, 0.2 mm, 0.4 mm, 0.6 mm, and 0.8 mm and the K value was varied by changing the thickness $t_1$ of the cover member. As a result, it was found that, for each gap length G, the index $b_1$ of the end portion back surface stress occurring in the cover member at the time of impact decreases linearly as the K value becomes smaller. More specifically, the relation (2), that is, $b_1 = (0.0982G + 3.3083)K + 0.1427G + 0.3651$, was found.

Then, the present inventors simulated HITs for the cases where the K value was fixed at 0.053 and the gap length G was varied. As a result, it was found that the index $b_2$ of the end portion back surface stress occurring in the cover member at the time of impact decreases linearly as the gap length G becomes smaller. More specifically, the relation (3), that is, $b_2 = 0.1401G + 0.5424$, was found.

The present inventors further performed HIT simulations. As a result, it was found that in the case where the sum $B_1$ of the above-described indices $b_1$ and $b_2$ of the end portion back surface stress occurring in the cover member is smaller than 1.33, that is, $B_1 = b_1 + b_2 < 1.33$ (i.e. relation (1)) is satisfied, breaking of the cover member can be prevented even when the edge E of the cover member receives impact along the line D (i.e., the cover member is superior in end portion impact resistance).

It is preferable that the parameter $B_1$ be smaller than 1.21 because the end portion impact resistance of the cover member is far superior when this condition is met. That is, it is preferable that the relation "$B_1 < 1.21$" (i.e. relation (4)) be satisfied. In this case, breaking of the cover member can be prevented even when the edge E of the cover member receives stronger impact.

Examples

The present invention is described below in a specific manner by way of Examples and the like. However, the present invention is not limited to the Examples described below.

⟨Preparation of Cover Members⟩

A rectangular chemically strengthened glass produced by performing chemical strengthening treatment on an aluminosilicate glass-based glass for chemical strengthening ("Dragon Trail" manufactured by AGC Inc.) was used as each cover member. In the chemically strengthened glass, the thickness (DOL) of a compressive stress layer was 35 μm and the surface compressive stress (CS) in the compressive stress layer was 750 MPa.

Each of such cover members had a size of 250 mm in the longitudinal direction and 145 mm in the shorter axis direction and its Young's modulus ($E_1$) was 74 GPa. The thickness ($t_1$) of each cover member is described below.

⟨Evaluation of End Portion Impact Resistance by Head Impact Tests⟩

A head impact test was conducted using each test sample and its end portion impact resistance was evaluated.

⟨⟨Manufacture of Test Samples⟩⟩

Test samples of an in-vehicle display device were manufactured using the thus-prepared cover members. The manufactured test samples are described with reference to FIG. 6.

Figure 6:
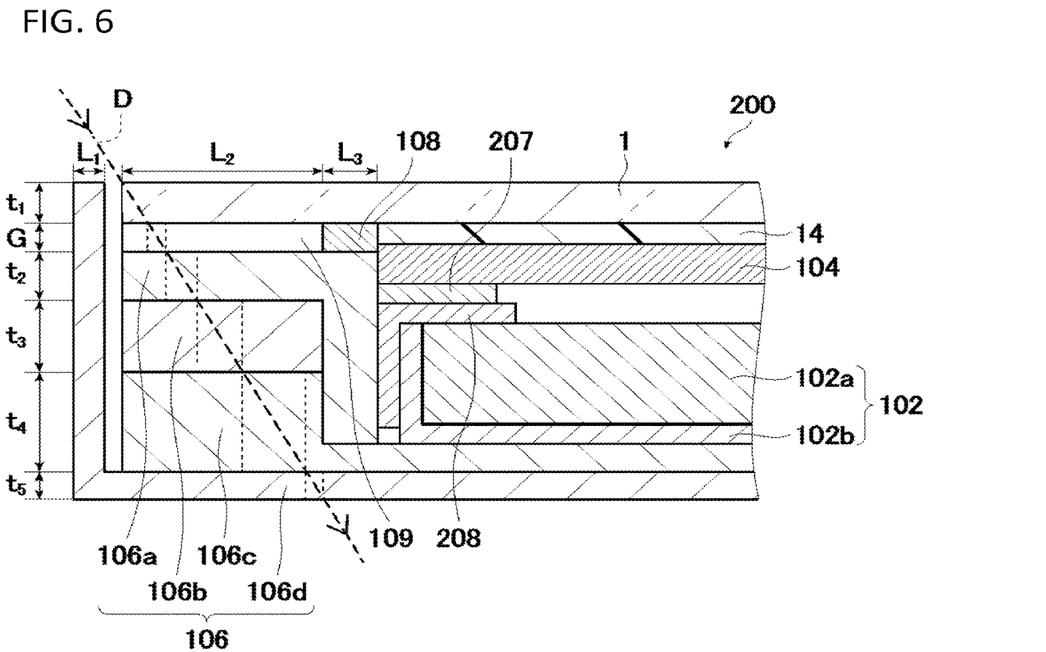
FIG. 6 is a sectional view of a test sample.

FIG. 6 is a sectional view of a test sample 200. Members in FIG. 6 having the same (or corresponding) members in the display device 100 shown in FIG. 1 to FIG. 4 are given the same reference symbols, and descriptions thereof may be omitted.

As shown in FIG. 6, a test sample 200 had a housing 106. More specifically, members 106c, 106b, and 106a were disposed inside a member 106d and they constituted the housing 106. A cover member 1 was the first layer, and the member 106a was the second layer, the member 106b was the third layer, the member 106c was the fourth layer, and the member 106d was the fifth layer.

A backlight unit 102 and a display panel 104 were disposed inside the housing 106. An end portion of the backlight unit 102 on the top surface side was covered with an L-shaped member 208 which is L-shaped in cross section. The top surface of the L-shaped member 208 and an end portion of the display panel 104 on the bottom surface side were bonded to each other with a double-sided adhesive tape 207. The cover member 1 was stuck to the top surface of the display panel 104 with an adhesive layer 14. Furthermore, the cover member 1 and the member 106a were bonded to each other with an adhesive member 108. In the test sample 200, the adhesive member 108 was stuck to the cover member 1 continuously alongside its entire circumference.

The details of the individual members of the test sample 200 were as follows:

Adhesive layer 14: OCA ("MHM-FWD" manufactured by Nichiei Kakoh Co., Ltd.)

Display panel 104: A replacement in which polarizing plates (material: TAC) were stuck to the two respective surfaces of a soda-lime glass (thickness: 1.1 mm) was used.

Backlight unit 102: A replacement in which a plate-like body 102a (material: PC; thickness: 4 mm) was covered with a recessed body 102b (material: aluminum; thickness: 1 mm) was used.

Double-sided adhesive tape 207: Material: PET, and tape thickness: 0.5 mm

L-shaped member 208: Material: PVC, thickness 1 mm, and length of each side of the L shape: 5 mm Member 106a of second layer: Material: ABS resin, and Young's modulus ($E_2$): 2.2 GPa Member 106b of third layer: Material: stainless steel, and Young's modulus ($E_3$): 206 GPa Member 106c of fourth layer: Material: magnesium alloy (Al: 3%, Zn: 1%), and Young's modulus ($E_4$): 45 GPa Member 106d of fifth layer: Material: ABS resin, and Young's modulus ($E_5$): 2.2 GPa Adhesive member 108: Material: PET, and thickness: 0.1 mm to 0.8 mm (same as a gap length G)

The size of $L_1$ to $L_3$ shown in FIG. 6 were as follows:
$L_1$: 1 mm
$L_2$: 8 mm
$L_3$: 2 mm.

In addition, each of the size of G and $t_1$ to $t_5$ shown in FIG. 6 is shown in Table 1.

⟨⟨Head Impact Test⟩⟩

Figure 7:
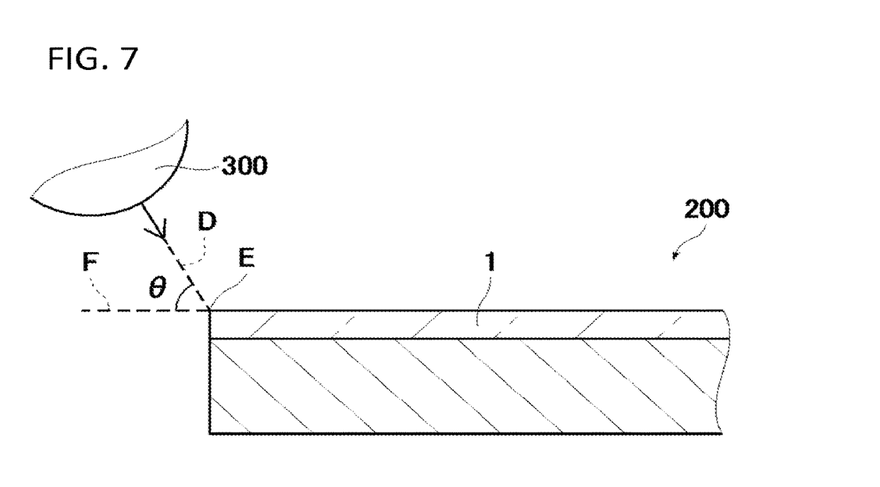
FIG. 7 is a schematic diagram illustrating a head impact test.

FIG. 7 is a schematic diagram illustrating a head impact test. In FIG. 7, the test sample 200 is simplified and only the cover member 1 is shown.

Each manufactured test sample 200 was put on a sponge (thickness 27 mm; not shown) and fixed to it and a spherical rigid model 300 (material: iron, diameter: 165 mm, mass: 12.9 kg) was caused to hit the edge E of the cover member 1 along the line D. The angle of collision of the rigid model 300 (i.e., the angle θ of the line D) was set at 60° with respect to the imaginary line F that was along the first main surface 1a of the cover member 1 and extended to the end surface 1d side.

As shown in FIG. 7, in the test sample 200, the cover member 1 (first layer) to the member 106d (fifth layer) were arranged on the line D, that is the line D passed through the cover member 1 (first layer) to the member 106d (fifth layer). The number n was 2 to 5, and the length ($t_n$) of the member of the $n^{th}$ layer in the thickness direction of the cover member 1 in the region through which the line D passed was equal to the thickness of the member of the $n^{th}$ layer.

A HIT test-1 (HIT-1) in which the collision energy of the rigid model 300 was set at 100 J and a HIT test-2 (HIT-2) in which the collision energy of the rigid model 300 was set at 150 J were conducted as head impact tests.

⟨⟨Evaluation of Impact Resistance⟩⟩

Whether the cover member 1 was broken was checked visually after each head impact test. Symbol "A" is described in Table 1 when no breaking was found, and symbol "B" is described in Table 1 when breaking was found. Symbol "A" means superior impact resistance.

TABLE 1

| | Gap length G (mm) | Young's modulus (GPa) | | | | | Thickness (mm) | | | | | K value | Relation (2) b1 | Relation (3) b2 | Relation (1) B1 = b1 + b2 | End portion impact resistance | |
|---|---|---|---|---|---|---|---|---|---|---|---|---|---|---|---|---|---|
| | | E1 | E2 | E3 | E4 | E5 | t1 | t2 | t3 | t4 | t5 | | | | | HIT-1 | HIT-2 |
| Case 1 | 0.1 | 74 | 2.2 | 206 | 45 | 2.2 | 1.1 | 2.7 | 2.5 | 2.5 | 2 | 0.0532 | 0.5559 | 0.5564 | 1.1123 | A | A |
| Case 2 | 0.2 | 74 | 2.2 | 206 | 45 | 2.2 | 1.1 | 2.6 | 2.5 | 2.5 | 2 | 0.0532 | 0.5708 | 0.5704 | 1.1412 | A | A |
| Case 3 | 0.4 | 74 | 2.2 | 206 | 45 | 2.2 | 1.1 | 2.4 | 2.5 | 2.5 | 2 | 0.0533 | 0.6006 | 0.5984 | 1.1991 | A | A |
| Case 4 | 0.6 | 74 | 2.2 | 206 | 45 | 2.2 | 1.1 | 2.2 | 2.5 | 2.5 | 2 | 0.0534 | 0.6304 | 0.6265 | 1.2569 | A | B |
| Case 5 | 0.8 | 74 | 2.2 | 206 | 45 | 2.2 | 1.1 | 2.0 | 2.5 | 2.5 | 2 | 0.0534 | 0.6602 | 0.6545 | 1.3147 | A | B |
| Case 6 | 0.1 | 74 | 2.2 | 206 | 45 | 2.2 | 1.3 | 2.7 | 2.5 | 2.5 | 2 | 0.0728 | 0.6208 | 0.5564 | 1.1772 | A | A |

TABLE 1-continued

|  | Gap length G (mm) | Young's modulus (GPa) | | | | | Thickness (mm) | | | | | K value | Relation (2) b1 | Relation (3) b2 | Relation (1) B1 = b1 + b2 | End portion impact resistance | |
|---|---|---|---|---|---|---|---|---|---|---|---|---|---|---|---|---|---|
|  |  | E1 | E2 | E3 | E4 | E5 | t1 | t2 | t3 | t4 | t5 |  |  |  |  | HIT-1 | HIT-2 |
| Case 7 | 0.2 | 74 | 2.2 | 206 | 45 | 2.2 | 1.3 | 2.6 | 2.5 | 2.5 | 2 | 0.0728 | 0.6360 | 0.5704 | 1.2064 | A | A |
| Case 8 | 0.4 | 74 | 2.2 | 206 | 45 | 2.2 | 1.3 | 2.4 | 2.5 | 2.5 | 2 | 0.0729 | 0.6662 | 0.5984 | 1.2647 | A | B |
| Case 9 | 0.6 | 74 | 2.2 | 206 | 45 | 2.2 | 1.3 | 2.2 | 2.5 | 2.5 | 2 | 0.0730 | 0.6965 | 0.6265 | 1.3230 | A | B |
| Case 10 | 0.8 | 74 | 2.2 | 206 | 45 | 2.2 | 1.3 | 2.0 | 2.5 | 2.5 | 2 | 0.0731 | 0.7268 | 0.6545 | 1.3812 | B | B |
| Case 11 | 0.1 | 74 | 2.2 | 206 | 45 | 2.2 | 2.0 | 2.7 | 2.5 | 2.5 | 2 | 0.1566 | 0.8991 | 0.5564 | 1.4556 | B | B |
| Case 12 | 0.2 | 74 | 2.2 | 206 | 45 | 2.2 | 2.0 | 2.6 | 2.5 | 2.5 | 2 | 0.1567 | 0.9153 | 0.5704 | 1.4857 | B | B |
| Case 13 | 0.4 | 74 | 2.2 | 206 | 45 | 2.2 | 2.0 | 2.4 | 2.5 | 2.5 | 2 | 0.1569 | 0.9475 | 0.5984 | 1.5459 | B | B |
| Case 14 | 0.6 | 74 | 2.2 | 206 | 45 | 2.2 | 2.0 | 2.2 | 2.5 | 2.5 | 2 | 0.1571 | 0.9797 | 0.6265 | 1.6062 | B | B |
| Case 15 | 0.8 | 74 | 2.2 | 206 | 45 | 2.2 | 2.0 | 2.0 | 2.5 | 2.5 | 2 | 0.1573 | 1.0118 | 0.6545 | 1.6663 | B | B |

As shown in the above Table 1, breaking of the cover member 1 was prevented in HIT test-1 in the case where the relation (1), that is, $B_1 = b_1 + b_2 < 1.33$, was satisfied. Furthermore, breaking of the cover member 1 was also prevented in HIT test-2 in the case where the relation (4), that is, $B_1 = b_1 + b_2 < 1.21$, was satisfied.

Next, head impact tests were conducted in the same manner as described above using other test samples and the end portion impact resistance was evaluated. The number of members arranged on the line D was increased or decreased in the test samples used. More specifically, three kinds of test samples, that is, test samples in which members of first to three layers were arranged on the line D, test samples in which members of first to fourth layers were arranged on the line D, and test samples in which members of first to sixth layers were arranged on the line D, were manufactured in the same manner as described above, and they were subjected to head impact tests. Results are shown in Table 2 below.

TABLE 2

|  | Gap length G (mm) | Young's modulus (GPa) | | | | | | Thickness (mm) | | | | | | K value | Relation (2) b1 | Relation (3) b2 | Relation (1) B1 = b1 + b2 | impact End portion resistance | |
|---|---|---|---|---|---|---|---|---|---|---|---|---|---|---|---|---|---|---|---|
|  |  | E1 | E2 | E3 | E4 | E5 | E6 | t1 | t2 | t3 | t4 | t5 | t6 |  |  |  |  | HIT-1 | HIT-2 |
| Case 16 | 0.2 | 74 | 2.2 | 206 |  |  |  | 1.1 | 2.4 | 5 |  |  |  | 0.0170 | 0.4504 | 0.5704 | 1.0208 | A | A |
| Case 17 | 0.4 | 74 | 2.2 | 206 |  |  |  | 1.1 | 2.4 | 5 |  |  |  | 0.0170 | 0.4792 | 0.5984 | 1.0777 | A | A |
| Case 18 | 0.8 | 74 | 2.2 | 206 |  |  |  | 1.1 | 2.4 | 5 |  |  |  | 0.0170 | 0.5370 | 0.6545 | 1.1915 | A | A |
| Case 19 | 0.2 | 74 | 2.2 | 206 | 45 |  |  | 1.1 | 2.4 | 2.5 | 4.5 |  |  | 0.0389 | 0.5231 | 0.5704 | 1.0936 | A | A |
| Case 20 | 0.4 | 74 | 2.2 | 206 | 45 |  |  | 1.1 | 2.4 | 2.5 | 4.5 |  |  | 0.0389 | 0.5524 | 0.5984 | 1.1509 | A | A |
| Case 21 | 0.8 | 74 | 2.2 | 206 | 45 |  |  | 1.1 | 2.4 | 2.5 | 4.5 |  |  | 0.0389 | 0.6111 | 0.6545 | 1.2655 | A | B |
| Case 22 | 0.2 | 74 | 2.2 | 206 | 45 | 206 | 2.2 | 1.1 | 2.4 | 1 | 2.5 | 2 | 2 | 0.0630 | 0.6032 | 0.5704 | 1.1736 | A | A |
| Case 23 | 0.4 | 74 | 2.2 | 206 | 45 | 206 | 2.2 | 1.1 | 2.4 | 1 | 2.5 | 2 | 2 | 0.0630 | 0.6329 | 0.5984 | 1.2314 | A | B |
| Case 24 | 0.8 | 74 | 2.2 | 206 | 45 | 206 | 2.2 | 1.1 | 2.4 | 1 | 2.5 | 2 | 2 | 0.0630 | 0.6925 | 0.6545 | 1.3470 | B | B |

As shown in the above Table 2, breaking of the cover member 1 was prevented in the HIT test-1 irrespective of the number n of layers of members in the case where the relation (1), that is, $B_1 = b_1 + b_2 < 1.33$, was satisfied. In particular, breaking of the cover member 1 was prevented in the case where the number n of layers was 3 or more.

Furthermore, breaking of the cover member 1 was also prevented in the HIT test-2 in the case where the relation (4), that is, $B_1 = b_1 + b_2 < 1.21$, was satisfied.

When the present invention are described in detail and with reference to specific embodiments thereof, it is apparent to one skilled in the art that various changes and modifications may be made therein without departing from the spirit and scope thereof.

DESCRIPTION OF REFERENCE NUMERALS AND SIGNS

1: Cover member
1*a*: First main surface of cover member
1*b*: Second main surface of cover member
1*c*: End portion of cover member
1*d*: End surface of cover member
14: Adhesive layer
100: Display device
102: Backlight unit
102*a*: Plate-like body
102*b*: Recessed body
104: Display panel
106: Housing
106*a*: Member
106*b*: Member
106*c*: Member
106*d*: Member
108: Adhesive member
109: Gap
200: Test sample
207: Double-sided adhesive tape
208: L-shaped member
300: Rigid model
400: Display device
D: Line D
E: Edge formed by first main surface of cover member and end surface of cover member
F: Imaginary line that passes through first main surface of cover member and extends to end-surface side of cover member
G: Length of gap in thickness direction of cover member in region through which line D passes $t_1$: Thickness of cover member
$t_2$: Length of member of second layer in thickness direction of cover member in region through which line D passes
$t_3$: Length of member of third layer in thickness direction of cover member in region through which line D passes
$t_4$: Length of member of fourth layer in thickness direction of cover member in region through which line D passes
$t_5$: Length of member of fifth layer in thickness direction of cover member in region through which line D passes
θ: Angle formed by line D and imaginary line F

The invention claimed is:

1. A display device, comprising:
a display panel; and
a cover member with which the display panel is covered, wherein:
the cover member includes a second main surface which faces the display panel, a first main surface which is opposite to the second main surface, and an end surface which connects the first main surface to the second main surface;
a line D is defined as an imaginary line that passes through an edge E formed by the first main surface of the cover member and the end surface of the cover member, and members of a first layer to a $n^{th}$ layer are arranged on the line D, the cover member being the first layer and n being an integer of 2 or more;
a gap exists in a part between the cover member and the member of the $n^{th}$ layer; and
the following relations (1) to (3) are satisfied:

$$B_1 = b_1 + b_2 < 1.33 \qquad (1)$$

$$b_1 = (0.0982G + 3.3083)K + 0.1427G + 0.3651 \qquad (2)$$

$$b_2 = 0.1401G + 0.5424 \qquad (3)$$

where G is a gap length of the gap, in mm, in a thickness direction of the cover member in a region through which the line D passes, and K in the relation (2) is defined as follows:

$$K = E_1 t_1^2 / (E_1 t_1^2 + \ldots + E_n t_n^2)$$

where $E_1$ is Young's modulus, in GPa, of the cover member, $t_1$ is a thickness, in mm, of the cover member, $E_n$ is Young's modulus, in GPa, of the member of the $n^{th}$ layer, and $t_n$ is a length of the member of the $n^{th}$ layer, in mm, in the thickness direction of the cover member in the region through which the line D passes.

2. The display device according to claim 1, wherein an angle formed by the line D and an imaginary line F being an imaginary line that is along the first main surface and extends to the side of the end surface is 30° to 90°.

3. The display device according to claim 2, wherein the angle formed by the line D and the imaginary line F is 45° or 60°.

4. The display device according to claim 1, wherein the $B_1$ satisfies the following relation (4):

$$B_1 = b_1 + b_2 < 1.21. \qquad (4)$$

5. The display device according to claim 1, wherein the cover member is a glass.

6. The display device according to claim 5, wherein the glass is a chemically strengthened glass.

7. The display device according to claim 6, wherein the chemically strengthened glass includes a compressive stress layer having a thickness of 10 μm or more, and the compressive stress layer has a surface compressive stress of 500 MPa or more.

8. The display device according to claim 1, wherein the thickness $t_1$ of the cover member is 0.5 to 3.0 mm.

9. The display device according to claim 1, wherein the gap exists between the cover member and the member of a second layer.

10. The display device according to claim 1, wherein the member of a second layer is made of an ABS resin or a PC resin.

11. The display device according to claim 1, wherein the member of a third layer is made of a stainless steel, an aluminum, or a magnesium alloy.

12. The display device according to claim 1, wherein the member of a fourth layer is made of a magnesium alloy, a stainless steel, or an aluminum.

13. The display device according to claim 1, wherein the member of a fifth layer is made of an ABS resin or a PC resin.

14. The display device according to claim 1, further comprising a function layer in/on a surface of the cover member.

15. The display device according to claim 14, wherein the function layer includes at least one layer selected from the group consisting of an antireflection layer, an antiglare layer, and an antifouling layer.

16. The display device according to claim 1, wherein the display device is an in-vehicle display device.

* * * * *